United States Patent [19]
Wolfe

[11] Patent Number: 5,578,285
[45] Date of Patent: Nov. 26, 1996

[54] PROCESS FOR REDUCING THE AVERAGE PARTICLE SIZE OF AMMONIUM PARATUNGSTATE POWDERS

[75] Inventor: Thomas A. Wolfe, Wyalusing, Pa.

[73] Assignee: Osram Sylvania Inc., Danvers, Mass.

[21] Appl. No.: 359,803

[22] Filed: Dec. 20, 1994

[51] Int. Cl.[6] ................................................ C01G 41/02
[52] U.S. Cl. ...................................... 423/593; 23/293 R
[58] Field of Search ........................... 423/593; 23/293 R

[56] References Cited

U.S. PATENT DOCUMENTS 3,175,881   3/1965   Chiola et al. ........................ 423/593
4,504,461   3/1985   Carpenter et al. .................... 423/593
4,557,923   12/1985  Powers et al. ....................... 423/593

*Primary Examiner*—Wayne Langel
*Attorney, Agent, or Firm*—Robert F. Clark

[57] ABSTRACT

A process for reducing the average particle size of an ammonium paratungstate powder having the steps of heating the ammonium paratungstate powder at a temperature of between about 110° C. to about 205° C. for a time sufficient to reduce the average particle size of the ammonium paratungstate powder by at least 20 percent.

19 Claims, 3 Drawing Sheets

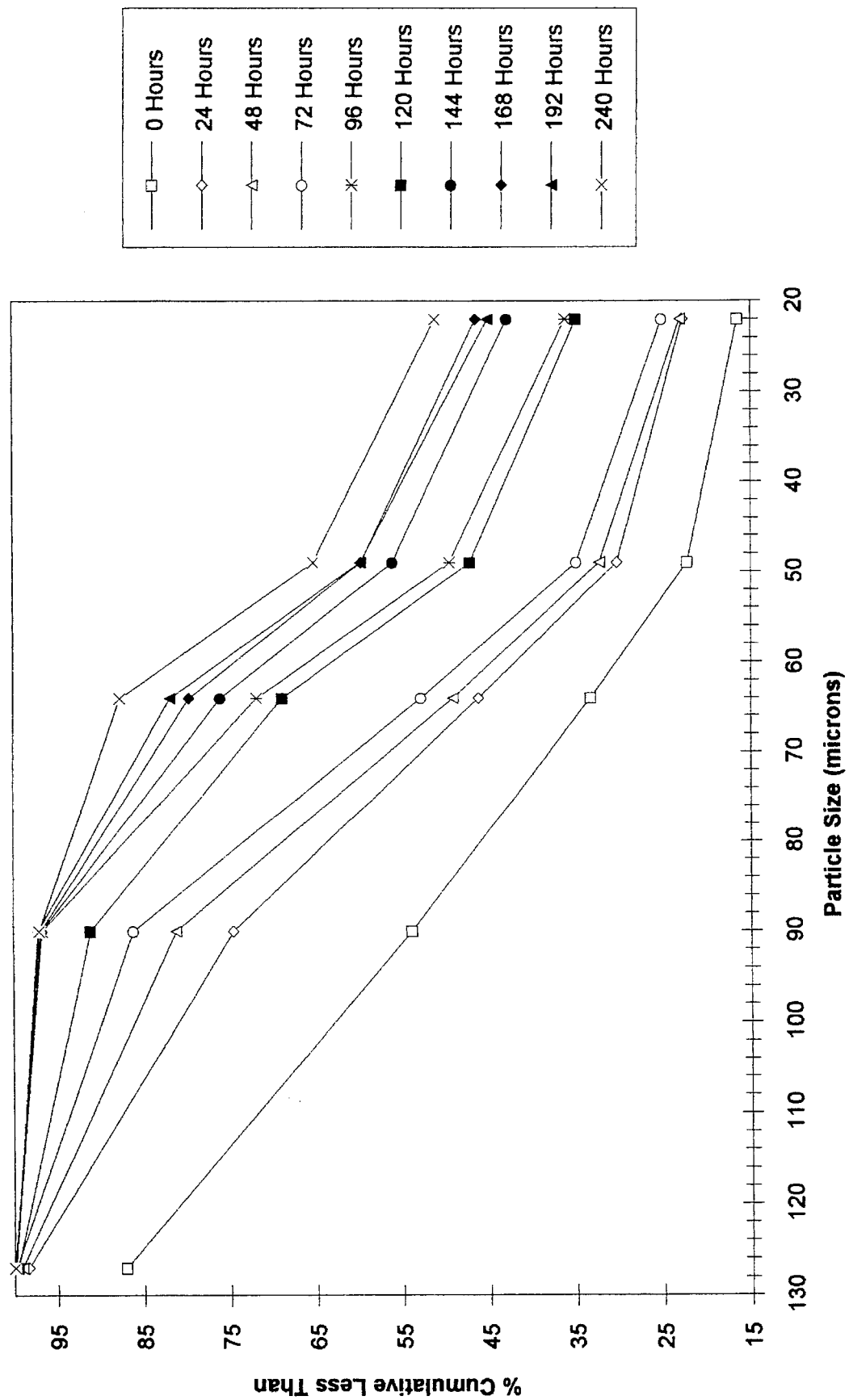
Fig. 1 (110°C)

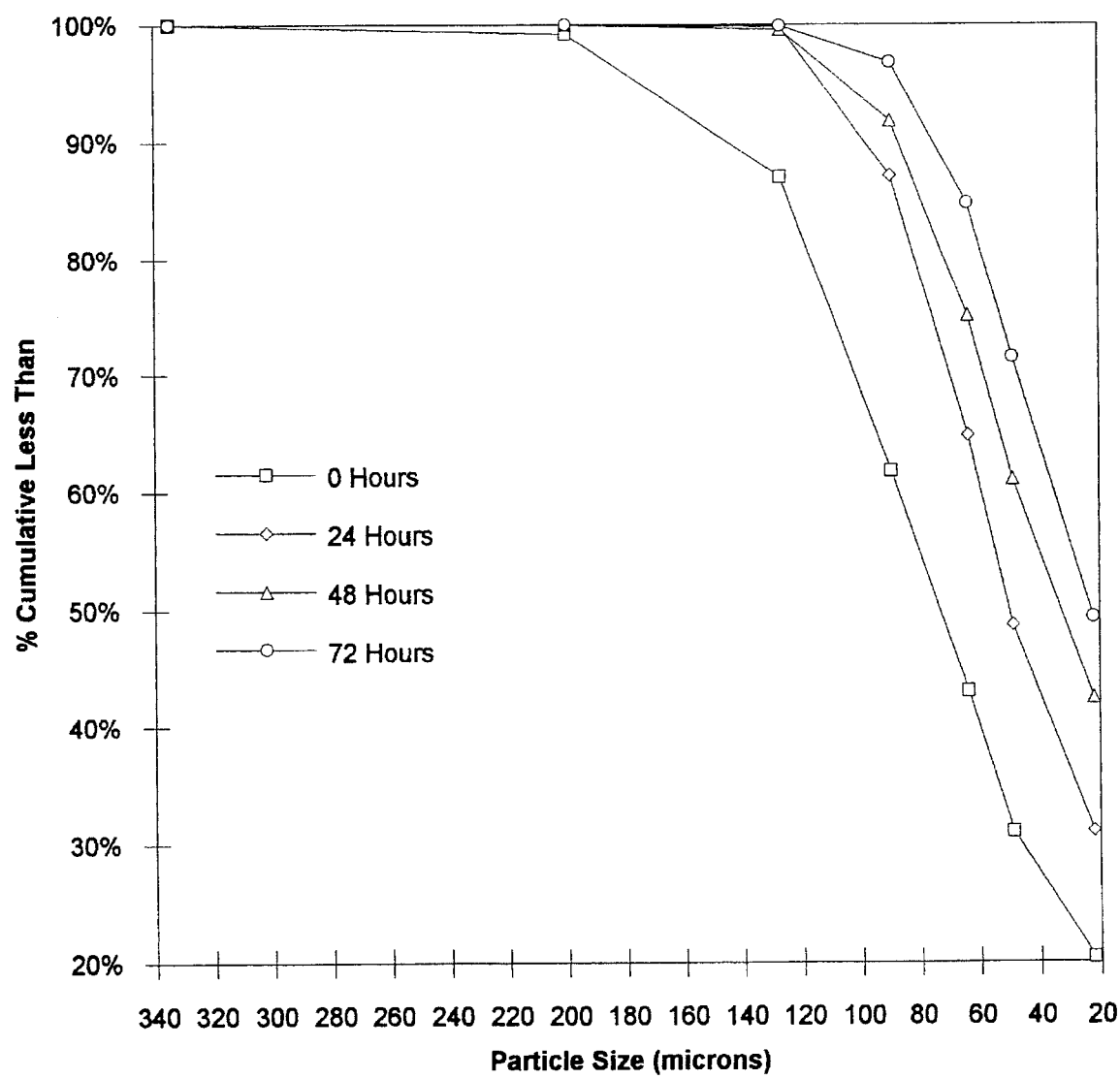
Fig. 2 (177°C)

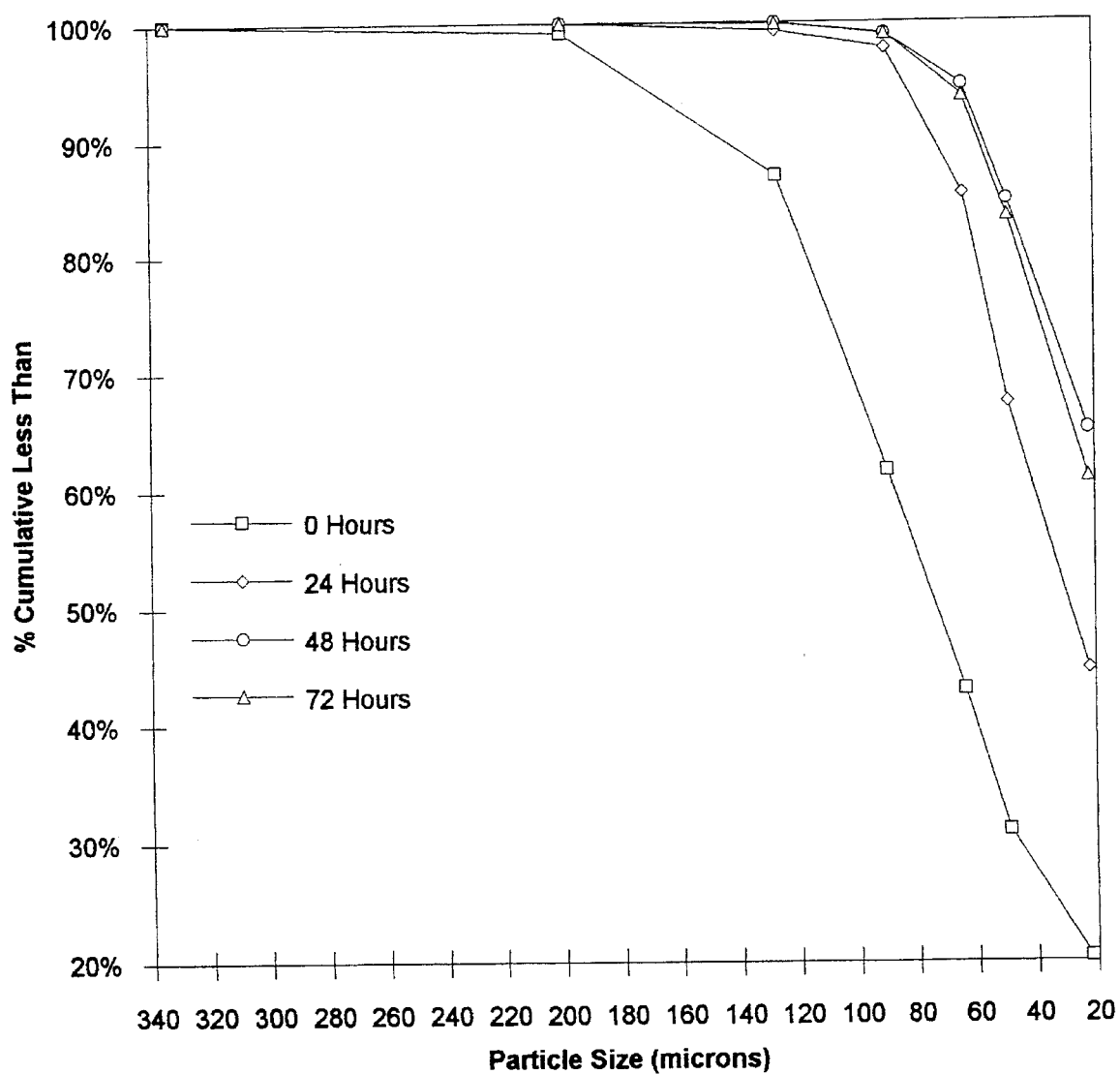

PROCESS FOR REDUCING THE AVERAGE PARTICLE SIZE OF AMMONIUM PARATUNGSTATE POWDERS

TECHNICAL FIELD

This invention relates to the production of ammonium paratungstates. More particularly, this invention relates to reducing the particle size of ammonium paratungstate powders.

BACKGROUND ART

While a number of applications exist for ammonium paratungstate (APT) powders, a particularly important application is their use as a source material in the production of tungsten and tungsten carbide powders. In this regard, it is desirable to produce ammonium paratungstate powders having specific particle distributions to influence the size of the resultant metal and carbide powders. It is particularly advantageous to be able to produce small size APT powders (mean particle size less than 80 microns) for use in producing small metal and carbide grades (mean particle size between 0.5 to 2 microns).

APT can be made from a number of processes. The primary hydrometallurgical synthesis used involves the formation of a sodium tungstate solution. This solution can then be purified and converted into an ammonium tungstate solution which is then evaporated to yield ammonium paratungstate. The particle size of crystalline APT powders precipitated from solution can be reduced by milling the powder. However, the milling introduces unwanted contamination into the APT powder. Smaller seed crystals of APT can be added to the saturated solutions to induce the formation of smaller APT crystals but milling APT to produce the desired size for the seed crystals may still lead to contamination of the precipitated crystals. Thus, it would be desirable to be able to produce APT powders having the desired particle sizes without milling.

SUMMARY OF THE INVENTION

It is an object of the invention to obviate the disadvantages of the prior art.

It is an object of this invention to provide a process for reducing the average particle size of ammonium paratungstate powders without milling.

In accordance with one aspect of the invention there is provided a process for reducing the average particle size of an ammonium paratungstate powder comprising the steps of heating the ammonium paratungstate powder at a temperature of between about 110° C. to about 205° C. for a time sufficient to reduce the average particle size of the ammonium paratungstate powder by at least 20 percent. In accordance with another aspect of the invention, the ammonium paratungstate powder is heated at a temperature of about 177° C. for about 72 hours in order to reduce the average particle size by at least 20 percent.

BRIEF DESCRIPTION OF THE DRAWINGS

FIG. 1 is a graph showing the particle size distributions at varying time intervals of an APT powder being heated at 110° C.

FIG. 2 is a graph showing the particle size distributions at varying time intervals of an APT powder being heated at 177° C.

FIG. 3 is a graph showing the particle size distributions at varying time intervals of an APT powder being heated at 204° C.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

It has been discovered that when APT is heated at temperatures of between about 110° C. to about 205° C. for extended periods of time, i.e. at least 24 hours, the average particle size of the powder can be reduced by at least 20 percent. The longer the APT is heated, the finer the particle size becomes. Although the particle size becomes smaller, the APT remains the same compound both crystallographically and chemically. However, at temperatures above about 205° C., the paratungstate begins to decompose to the metatungstate and yellow tungsten oxide. Significant decomposition of APT occurs above 215° C. The most preferred heating conditions are 177° C. for 72 hours. The fine APT powders dried under those conditions can then be used to seed evaporators used to produce batch quantities of the smaller sized APT. This method is more economical than heating large quantities of APT to produce finer sized powders.

It has also been observed that the morphology of APT is altered upon prolonged heating. Originally APT crystals produced by precipitation from solution have a block-like appearance. When these crystals are heated under the above conditions, the particles breakup and appear more plate-like with jagged edges. Thus, by heating APT for extended periods of time, it is possible to both control its particle size and morphology.

The following non-limiting examples are presented.

EXAMPLES

Slurries of precipitated APT crystals were obtained from evaporators containing ammonium tungstate solutions. The slurries were decanted and dried in a vacuum dryer equipped with a steam jacket (210° to 240° F.) for approximately 5 hours to remove residual moisture and form a free flowing powder. The APT powders were then heated in an oven at various temperatures between 110° C. and 205° C. Representative samples of the powders were removed at periodic intervals and sieved to determine the distribution of particle sizes. X-ray diffraction analysis confirmed that the reduced size ammonium paratungstate powders were still in the paratungstate form. Tables 1–3 give the weight distribution of the sieve fractions for the different heating conditions in terms of % cumulative less than. The average particle size as used herein is defined as the particle size at 50% cumulative less than.

FIGS. 1–3 are plots of the data from Tables 1–3, respectively. The midpoint of the sieve fraction is plotted against the size of the fraction in terms of % cumulative less than. The average particle sizes determined from the plotted data are given in Table 4. Average particle sizes are not given for some heating conditions because the particle size distribution curves did not reach the 50% value, i.e., more than 50 wt. % of the powder was contained in the −325 mesh fraction.

TABLE 1

Weight Distribution of Sieve Fractions for Various Drying Times at 110° C. (% Cumulative Less Than)

| Sieve Fraction (Mesh Sizes) | −60 +100 | −100 +140 | −140 +200 | −200 +270 | −270 +325 | −325 |
|---|---|---|---|---|---|---|
| Midpoint (μm) | 200 | 127 | 90 | 64 | 49 | 22 |
| 0 Hours | 99.34 | 87.08 | 53.94 | 33.3 | 22.26 | 16.45 |
| 24 Hours | 99.99 | 98.4 | 74.6 | 46.22 | 30.3 | 22.75 |
| 48 Hours | 100 | 99.13 | 81.28 | 49.15 | 32.3 | 23.07 |
| 72 Hours | 100 | 99.81 | 86.2 | 52.87 | 34.93 | 25.1 |
| 96 Hours | 100 | 99.98 | 96.74 | 71.91 | 49.53 | 36.18 |
| 120 Hours | 100 | 99.66 | 91.16 | 68.97 | 47.14 | 34.94 |
| 144 Hours | 100 | 99.98 | 96.82 | 76.1 | 56.13 | 42.9 |
| 168 Hours | 100 | 99.93 | 96.9 | 79.72 | 59.81 | 46.48 |
| 192 Hours | 100 | 99.92 | 97.23 | 81.97 | 59.85 | 45.07 |
| 240 Hours | 100 | 99.97 | 97.08 | 87.71 | 65.34 | 51.19 |

TABLE 2

Weight Distribution of Sieve Fractions for Various Drying Times at 177° C. (% Cumulative Less Than)

| Sieve Fraction (Mesh Sizes) | −40 +60 | −60 +100 | −100 +140 | −140 +200 | −200 +270 | −270 +325 | −325 |
|---|---|---|---|---|---|---|---|
| Midpoint (μm) | 335 | 200 | 127 | 90 | 64 | 49 | 22 |
| 0 Hours | 100 | 99 | 87 | 62 | 43 | 31 | 20 |
| 24 Hours | 100 | 100 | 100 | 87 | 65 | 49 | 31 |
| 48 Hours | 100 | 100 | 100 | 92 | 75 | 61 | 42 |
| 72 Hours | 100 | 100 | 100 | 97 | 85 | 71 | 49 |

TABLE 3

Weight Distribution of Sieve Fractions for Various Drying Times at 204° C. (% Cumulative Less Than)

| Sieve Fraction (Mesh Sizes) | −40 +60 | −60 +100 | −100 +140 | −140 +200 | −200 +270 | −270 +325 | −325 |
|---|---|---|---|---|---|---|---|
| Midpoint (μm) | 335 | 200 | 127 | 90 | 64 | 49 | 22 |
| 0 Hours | 100% | 99% | 87% | 62% | 43% | 31% | 20% |
| 24 Hours | 100% | 100% | 99% | 98% | 85% | 67% | 45% |
| 48 Hours | 100% | 100% | 100% | 99% | 95% | 85% | 65% |
| 72 Hours | 100% | 100% | 100% | 99% | 94% | 83% | 61% |

TABLE 4

Particle Size in Microns at 50% Cumulative Less Than

| Temp. | 0 Hours | 24 Hours | 48 Hours | 72 Hours | 96 Hours | 120 Hours | 144 Hours | 168 Hours | 192 Hours | 240 Hours |
|---|---|---|---|---|---|---|---|---|---|---|
| 110° C. | 85 | 67 | 65 | 61 | 49 | 51 | 36 | 29 | 31 | — |
| 177° C. | 74 | 51 | 34 | 25 | — | — | — | — | — | — |
| 204° C. | 74 | 30 | — | — | — | — | — | — | — | — |

Table 4 shows that there is a significant reduction in the average particle size of the APT powders at each temperature after 24 hours of heating. The data further show that the magnitude of the reduction in the average particle size increases with temperature. At 110° C., there is a reduction of about 20% in the average particle size in the first 24 hours. At 177° C., the average particle size is reduced by about 30% for the same length of time. And at 204° C., the average particle size is reduced by 60% in the first 24 hours.

FIGS. 1–3 show that the particle size distributions of the APT powders move towards finer particles sizes as heating time increases. Thus, these examples demonstrate that the particle size distributions of APT powders may be made significantly finer without resorting to milling.

While there has been shown and described what are at the present considered the preferred embodiments of the invention, it will be obvious to those skilled in the art that various changes and modifications may be made therein without departing from the scope of the invention as defined by the appended claims.

I claim:

1. A process for reducing the average particle size of an ammonium paratungstate powder comprising the steps of heating the ammonium paratungstate powder at a temperature of between about 110° C. to about 205° C. for a time sufficient to reduce the average particle size of the ammonium paratungstate powder by at least 20 percent.

2. The process of claim 1 wherein the time sufficient to reduce the average particle size is at least 24 hours.

3. The process of claim 1 wherein the temperature is about 177° C. and the time is about 72 hours.

4. The process of claim 1 wherein the average particle size is reduced by at least 30 percent.

5. The process of claim 1 wherein the average particle size is reduced by at least 60 percent.

6. The process of claim 1 wherein, after heating, the ammonium paratungstate powder consists of ammonium paratungstate as determined by x-ray diffraction.

7. The process of claim 6 wherein the average particle size is reduced by at least 30 percent.

8. The process of claim 6 wherein the average particle size is reduced by at least 60 percent.

9. A process for producing ammonium paratungstate comprising obtaining seed crystals of ammonium paratungstate by heating an ammonium paratungstate powder between about 110° C. to about 205° C. for a time sufficient to reduce the average particle size of the ammonium paratungstate powder by at least 20 percent, adding the seed crystals to a saturated solution of ammonium tungstate, and precipitating crystals of ammonium paratungstate.

10. The process of claim 9 wherein the average particle size is reduced by at least 30 percent.

11. The process of claim 9 wherein the average particle size is reduced by at least 60 percent.

12. The process of claim 9 wherein, after heating, the ammonium paratungstate powder consists of ammonium paratungstate as determined by x-ray diffraction.

13. The process of claim 12 wherein the average particle size is reduced by at least 30 percent.

14. The process of claim 12 wherein the average particle size is reduced by at least 60 percent.

15. A process for reducing the average particle size of an ammonium paratungstate powder comprising the steps of heating the ammonium paratungstate powder at a temperature of between about 110° C. to about 177° C. for a time sufficient to reduce the average particle size of the ammonium paratungstate powder by at least 20 percent.

16. The process of claim 15 wherein the time sufficient to reduce the average particle size is at least 24 hours.

17. The process of claim 16 wherein the temperature is about 177° C. and the time is about 72 hours.

18. The process of claim 15 wherein the average particle size is reduced by at least 30 percent.

19. The process of claim 15 wherein the average particle size is reduced by at least 60 percent.

* * * * *